(12) United States Patent
Koga

(10) Patent No.: US 9,038,612 B2
(45) Date of Patent: May 26, 2015

(54) EXHAUST GAS RECIRCULATION DEVICE OF MULTI-CYLINDER ENGINE

(71) Applicant: Mazda Motor Corporation, Aki-gun, Hiroshima (JP)

(72) Inventor: Tatsuya Koga, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 190 days.

(21) Appl. No.: 13/888,918

(22) Filed: May 7, 2013

(65) Prior Publication Data

US 2013/0306041 A1    Nov. 21, 2013

(30) Foreign Application Priority Data

May 18, 2012   (JP) .................................. 2012-114629

(51) Int. Cl.
*F02M 25/07*          (2006.01)

(52) U.S. Cl.
CPC ........... *F02M 25/07* (2013.01); *F02M 25/0726* (2013.01); *F02M 25/0751* (2013.01); *Y02T 10/121* (2013.01)

(58) Field of Classification Search
USPC ............. 123/568.11, 568.12, 568.26, 406.44, 123/406.48, 698
See application file for complete search history.

(56) References Cited

U.S. PATENT DOCUMENTS 5,632,261 A * 5/1997 Maki et al. ..................... 123/674
8,776,768 B2 * 7/2014 Otsubo et al. .............. 123/568.2

FOREIGN PATENT DOCUMENTS

JP         06108928 A     4/1994

* cited by examiner

*Primary Examiner* — Hung Q Nguyen
(74) *Attorney, Agent, or Firm* — Alleman Hall McCoy Russell & Tuttle LLP

(57) ABSTRACT

An exhaust gas recirculation device is provided. The device recirculates, from an exhaust system to an intake system, a part of exhaust gas from a plurality of cylinders of a multi-cylinder engine as EGR gas. The device includes a single EGR pipe extending from the exhaust system toward the intake system, an EGR manifold branching from a downstream end portion of the EGR pipe toward each cylinder, and an EGR valve for adjusting an EGR gas amount. The EGR manifold has one or more common EGR passages having a single pipe portion and branched pipe portions, and one or more independent EGR passages. Each shape of the common and independent EGR passages is set so that a communicating path in the EGR manifold communicating an arbitrary cylinder with a cylinder where combustion is performed subsequently thereto has the same volume for any cylinder combination having the adjacent combustion order.

6 Claims, 11 Drawing Sheets

EXHAUST GAS RECIRCULATION DEVICE OF MULTI-CYLINDER ENGINE

BACKGROUND

The present invention relates to an exhaust gas recirculation device for recirculating, from an exhaust system to an intake system, a part of exhaust gas discharged from each of a plurality of cylinders which are provided to a multi-cylinder engine as EGR gas.

Conventional exhaust gas recirculation devices of multi-cylinder engines includes an exhaust gas recirculation device disclosed in JP1993-108928A. This device is for an in-line four-cylinder engine having four cylinders aligned in a specific direction. The device includes exhaust gas recirculating passages extending from respective exhaust ports of the cylinders of the engine, an exhaust gas distributing block connected to each exhaust gas recirculating passage on a downstream side and communicated with independent intake passages (four intake passages coupling the intake ports of the cylinders to a surge tank) of the engine, and openable-and-closeable EGR valves (exhaust gas recirculating control valves) provided between the exhaust gas recirculating passage and the exhaust gas distributing block. Exhaust gas led out through the exhaust gas recirculating passage (EGR gas) is further led into the common exhaust gas distributing block, and then further introduced into the respective independent intake passages of the cylinders.

However, as described in JP1993-108928A, with the common exhaust gas distributing block provided between the exhaust gas recirculating passage and the independent intake passages of the cylinders, intake interference occurs between the cylinders through this exhaust gas distributing block, and additionally, it is concerned with the level of the intake interference varying among the cylinders. The variation of intake interference causes a variation in the amount of EGR gas to be led into the cylinders (EGR amount), and a stable combustion may not be performed in all the cylinders.

Obviously, unlike JP1993-108928A, such variation of the EGR amount is reduced by returning the EGR gas, which is led out through the exhaust gas recirculating passages to a large volume surge tank provided upstream of the independent intake passages of the cylinders, and by distributing the exhaust gas from the surge tank to the cylinders. However, in such a case, an opening of the EGR valve is controlled to adjust the EGR amount, followability of the EGR amount to the opening control of the EGR valve degrades, and an unavoidable problem of causing comparatively large response delay arises.

SUMMARY

The present invention is made in view of the above situations and provides an exhaust gas recirculation device of a multi-cylinder engine that can adjust an EGR amount by an opening control of an EGR valve in excellent responsiveness, and further can effectively suppress a variation of the EGR amount to be led into cylinders.

According to one aspect of the invention, an exhaust gas recirculation device for recirculating from an exhaust system to an intake system, a part of exhaust gas discharged from each of a plurality of cylinders that are provided to a multi-cylinder engine as EGR gas is provided. The exhaust gas recirculation device includes a single EGR pipe extending from an exhaust system toward an intake system, an EGR manifold provided to branch from a downstream end portion of the EGR pipe toward each of the plurality of cylinders, and an EGR valve for adjusting an amount of EGR gas recirculated into the cylinders through the EGR pipe and the EGR manifold. The EGR manifold has one or more common EGR passages having a single pipe portion extending from the downstream end portion of the EGR pipe and branched pipe portions extending while branching from the single pipe portion and provided to communicate with intake ports of two or more of the plurality of cylinders of which the combustion order is not adjacent therebetween. The EGR manifold also has one or more independent EGR passages extending from the downstream end portion of the EGR pipe and provided to communicate with an intake port of a specific cylinder. Shapes of the one or more common EGR passages and the one or more independent EGR passages are respectively set so that a communicating path in the EGR manifold which communicates an arbitrary cylinder with a subsequent cylinder where a combustion is preformed next to the arbitrary cylinder has the same volume for any combination of the cylinders of which the combustion order is adjacent therebetween.

According to the aspect of the present invention, because the EGR gas introduced from the EGR pipe is recirculated into the plurality of cylinders through the EGR manifold which is branched toward the plurality of cylinders, unlike in a case of adopting a configuration in which the EGR gas from the EGR pipe is introduced into a surge tank having a large volume and then distributed to each cylinder, the opening change of the EGR valve can directly influence the introduction amount of the EGR gas to each cylinder, and can adjust the EGR amount to each cylinder with excellent responsiveness.

Moreover, in the aspect of the present invention, because a communicating path in the EGR manifold which communicates cylinders with each other has the same volume for any combination of the cylinders of which the combustion order is adjacent therebetween, the variation of the EGR amount among the cylinders can be suppressed for each cylinder. That is, when the EGR valve is opened, the intake interference occurs by a wave of pressure change (compressional wave) which is caused in an intake port of one cylinder, propagating through a predetermined communicating path in the EGR manifold, and reaching the intake port of a subsequent cylinder where the combustion order is the next. Here, when the volumes of the communicating paths are all the same as described above, the intensity of the intake interference occurring between the cylinders where the combustion order is adjacent therebetween can be adjusted to be about the same for any combination of cylinders, and therefore, the amount of EGR gas to be introduced into the cylinders can be prevented from varying greatly.

The engine may be a four-cylinder engine having total of four cylinders aligned in a specific direction and of which the combustion order is set to the order of the first cylinder, the third cylinder, the fourth cylinder, and then the second cylinder starting from the cylinder at one end in the cylinder aligned direction. Preferably, the EGR manifold may include one common EGR passage for supplying the EGR gas to two of the cylinders positioned inward in the cylinder direction, and two independent EGR passages for supplying the EGR gas to the other two cylinders positioned outward in the cylinder aligned direction. Shapes of the common EGR passage and the independent EGR passages are respectively set so that all the common and independent EGR passages have the same volume.

According to such a configuration, the variation of the EGR amount to each cylinder can be suppressed while effectively reducing in size the EGR manifold provided in the four-cylinder engine.

In the above configuration, the common EGR passage and the independent EGR passages may be arranged in the same plane.

According to such a configuration, there is an advantage in that the manufacture and attaching of the EGR manifold becomes easy.

In the case that the above engine is an engine in which HCCI combustion that is caused by a self-ignition of fuel containing gasoline is able to be executed within at least a part of an engine operating range, the EGR valve may be opened at least within the executing range where the HCCI combustion is performed.

According to such a configuration, within the performing range of the HCCI combustion, in which the timing and success of the self-ignition are easily influenced by the amount of EGR gas to be introduced into the cylinders, the variation in the amount of EGR gas to each cylinder is suppressed, and about the same amount of EGR gas is secured for all the cylinders. In this manner, a large variation in start timing of the HCCI combustion among the cylinders and misfire can be prevented effectively, and thus, the HCCI combustions in all the cylinders can be stabilized effectively.

DETAILED DESCRIPTION OF EMBODIMENTS

First Embodiment

Figure 1:
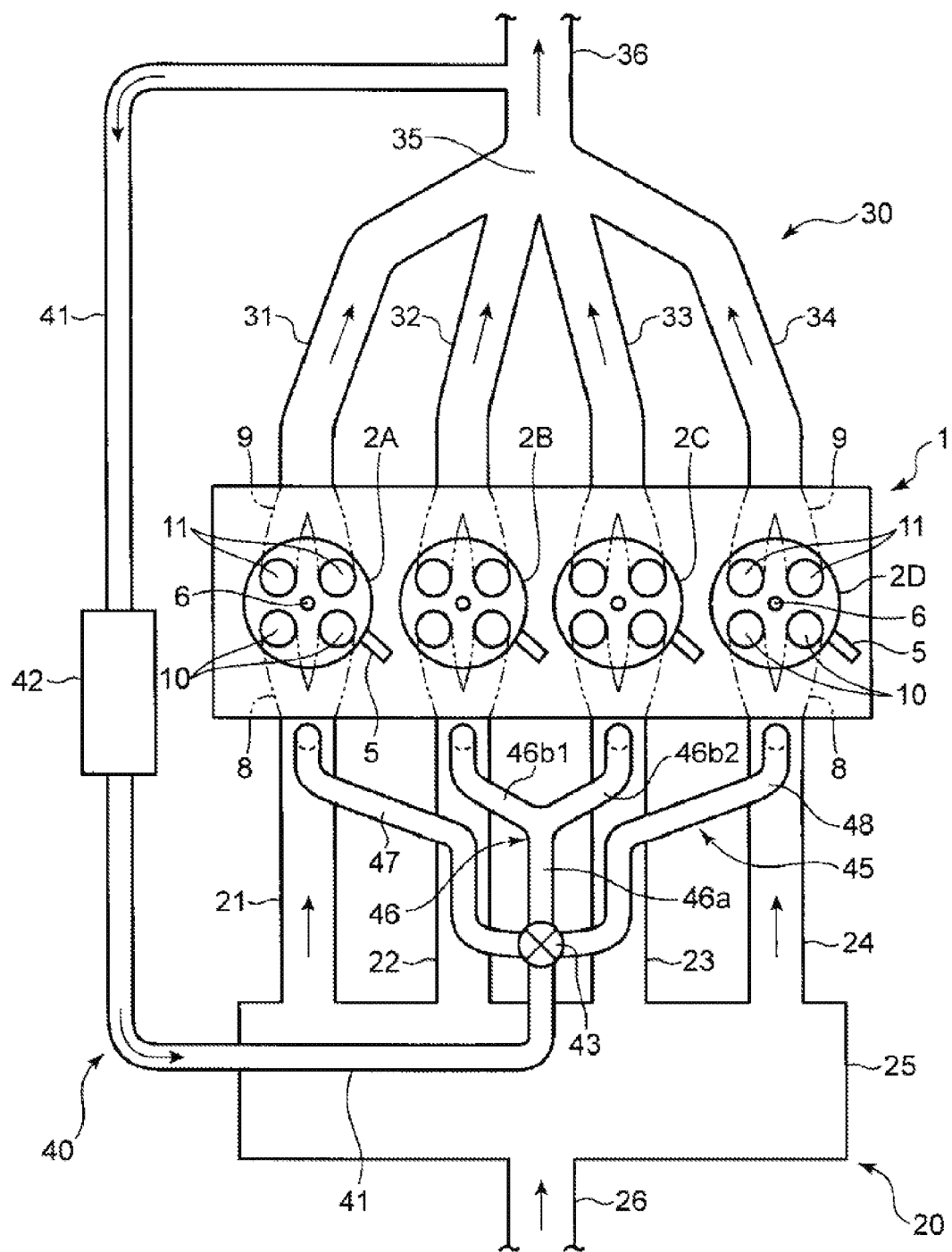
FIG. 1 is a diagram showing an overall configuration of an engine applied with an exhaust gas recirculation device according to a first embodiment of the invention.

FIG. 1 is a diagram showing an overall configuration of an engine applied with an exhaust gas recirculation device according to a first embodiment of the invention. The engine of this embodiment includes an engine body 1 of a four-cylinder four-cycle type having four cylinders 2A to 2D aligned in a specific direction, an intake system 20 constituted with, for example, various passages for introducing air for combustion into the engine body 1, and an exhaust system 30 constituted with, for example, various passages for discharging exhaust gas generated in the engine body 1.

Inside the cylinders 2A to 2D of the engine body 1, pistons (not illustrated) are reciprocatably inserted and coupled to a crankshaft which is an output shaft, via connecting rods, respectively. Combustion chambers are partitioned above the respective pistons, and injectors 5 for injecting into the respective cylinders 2A to 2D, fuel containing gasoline are provided, each of the cylinders 2A to 2D are provided with one injector. The fuel injected by the injector 5 is combusted inside the combustion chamber of each of the cylinders 2A to 2D, the piston is pushed down by an expansion force caused by the combustion and reciprocates in up-and-down directions, and thus, the crankshaft rotates about its central axis.

In the four-cycle four-cylinder engine as described above, the pistons provided to the respective cylinders 2A to 2D move in the up-and-down directions with their phases different from each other by 180° in crank angle (180° CA). Therefore, combustion timings of the cylinders 2A to 2D are set to vary in phase from each other by 180° CA. Specifically, when the cylinders 2A to 2D are numbered from one end in the cylinder aligned direction (i.e., the cylinders 2A to 2D are numbered as first, second, third, and fourth, respectively), the combustion is performed in the order of the first cylinder 2A, the third cylinder 2C, the fourth cylinder 2D, and then the second cylinder 2B. Therefore, for example, when the first cylinder 2A is on expansion stroke, the third cylinder 2C, the fourth cylinder 2D, and the second cylinder 2B are on compression stroke, intake stroke, and exhaust stroke, respectively.

Figure 2:
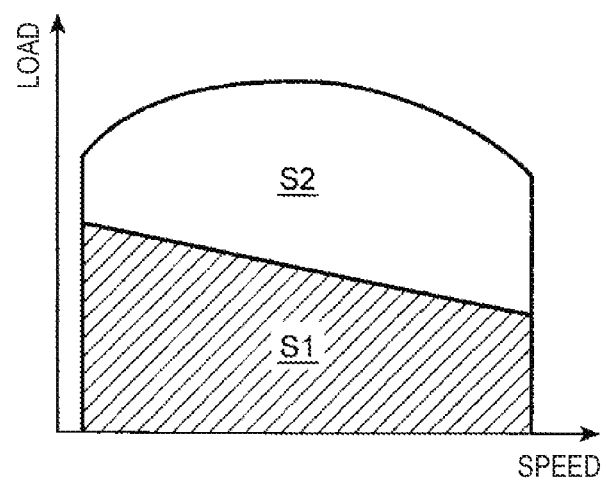
FIG. 2 is a chart showing an operation map which is referred to when selecting a combustion mode of the engine (between an HCCI combustion and an SI combustion).
Figure 3:
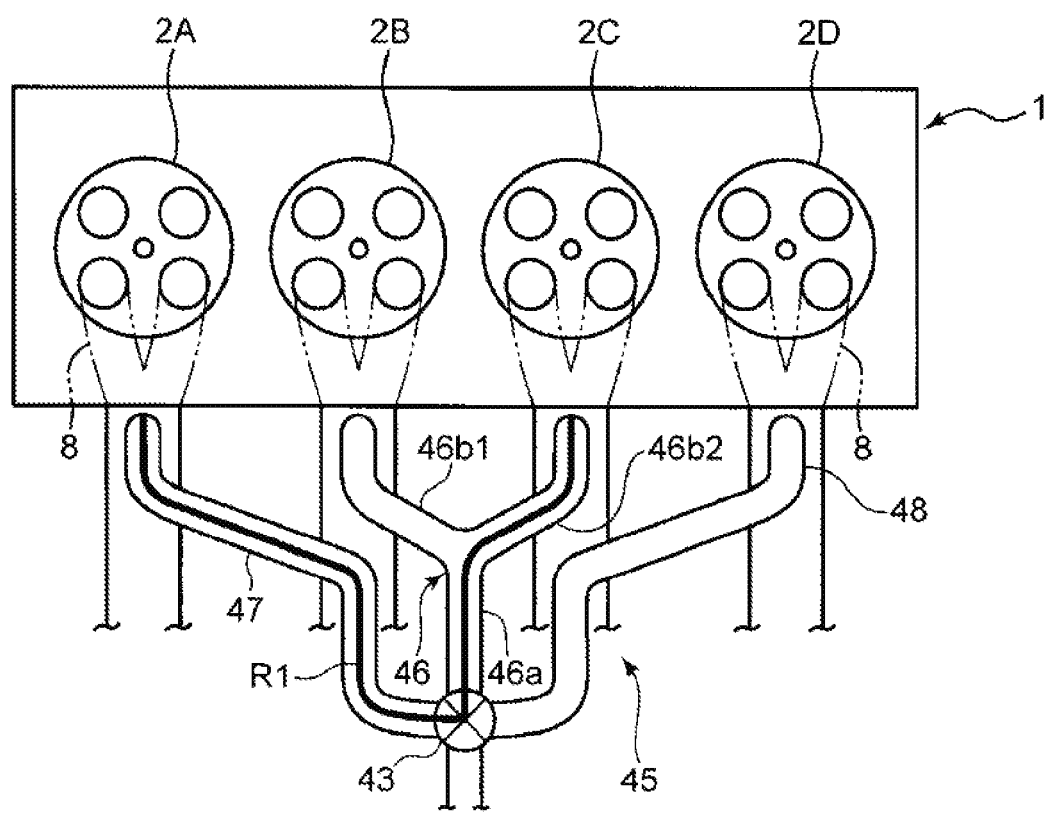
FIG. 3 is a diagram showing a communicating path inside an EGR manifold, which connects between a first cylinder and a third cylinder of the engine.
Figure 4:
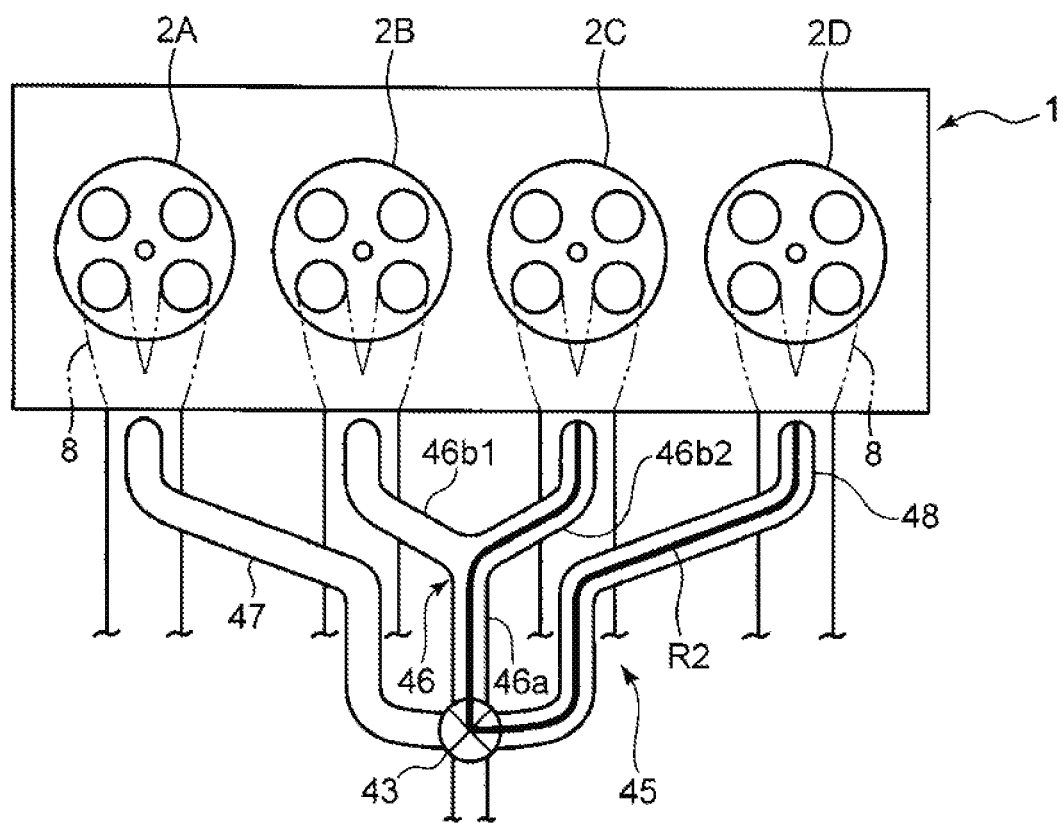
FIG. 4 is a diagram showing a communicating path inside the EGR manifold, which connects between the third cylinder and a fourth cylinder of the engine.
Figure 5:
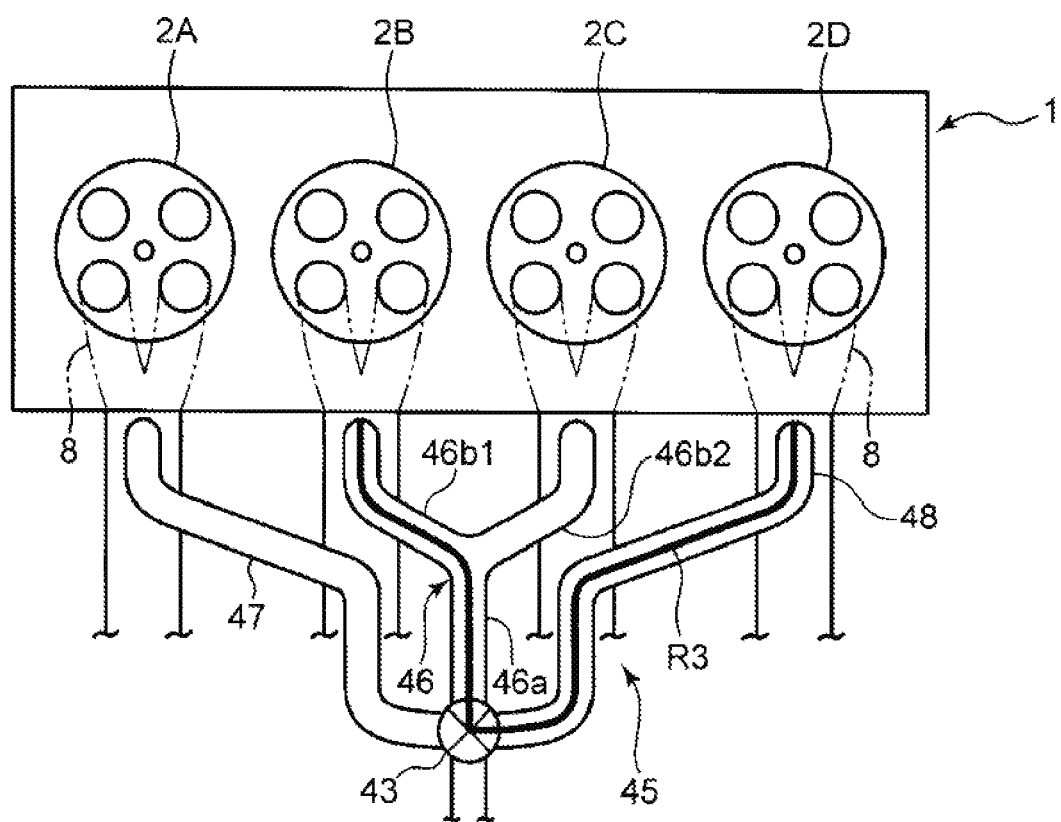
FIG. 5 is a diagram showing a communicating path inside the EGR manifold, which connects between the fourth cylinder and a second cylinder of the engine.
Figure 6:
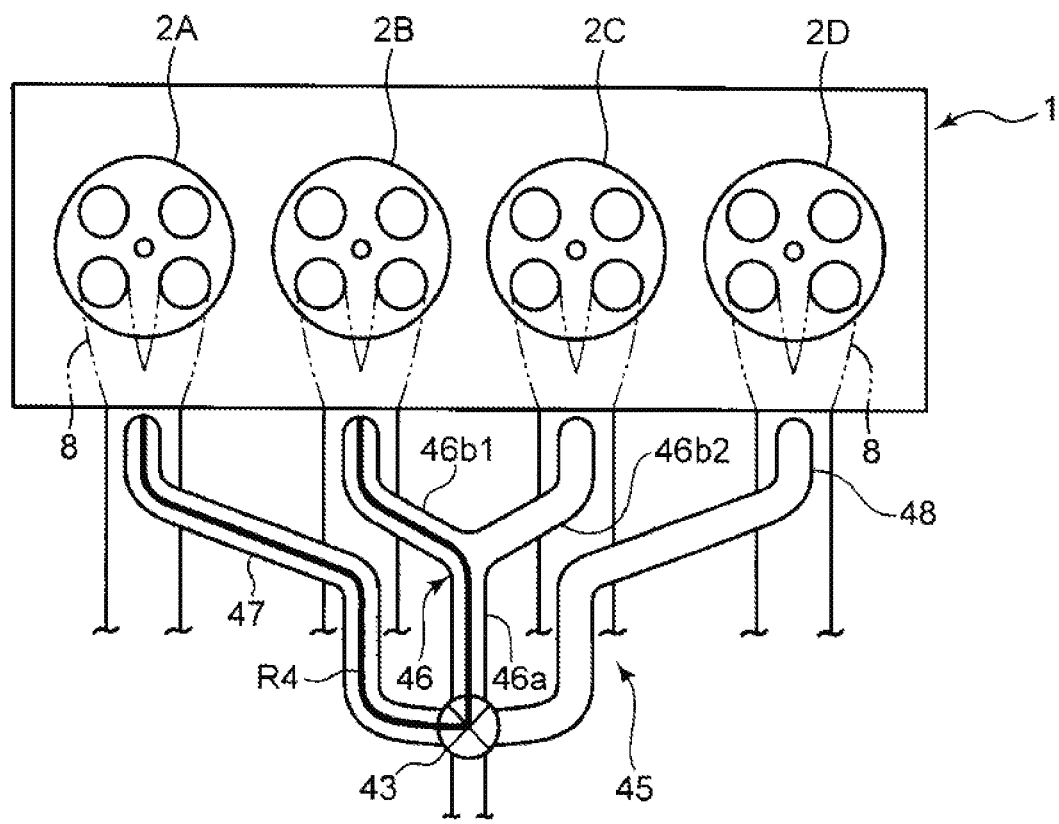
FIG. 6 is a diagram showing a communicating path inside the EGR manifold, which connects between the second cylinder and the first cylinder of the engine.

Additionally, in the engine of this embodiment, within a first operating range S1 set to be a part of an engine load range (shown in FIG. 2), a combustion in which the fuel containing gasoline is injected during the intake stroke or compression stroke and mixture gas of the injected fuel and air is increased in temperature and pressure by a compression action of the piston to self-ignite, in other words, the HCCI combustion (Homogeneous-Charge Compression Ignition combustion) is performed. On the other hand, within a second operating range S2 on a higher engine load side than the first operating range S1, an SI combustion (Spark Ignition combustion) is performed, in which the mixture gas is combusted by flame propagation triggered by a forcible ignition due to spark discharge. Therefore, as shown in FIG. 1, a spark plug 6 for performing spark discharge during an operation within the second operating range S2 is provided to a top portion of the engine body 1 (cylinder head) for each of the cylinders 2A to 2D.

The top portion of the engine body 1 is formed with intake ports 8 for introducing air which is supplied from the intake system 20, into the combustion chambers of the cylinders 2A to 2D, and is provided with openable-and-closeable intake valves 10 each provided to an opening of the intake port 8 on the combustion chamber side. The top portion of the engine body 1 is formed with exhaust ports 9 for introducing the exhaust gas generated in the combustion chambers of the cylinders 2A to 2D out to the exhaust system 30, and is provided with openable-and-closeable exhaust valves 11 each provided to an opening of the exhaust port 9 on the combustion chamber side. Note that, the engine in the drawings is a so-called double overhead camshaft (DOHC) engine in which two intake valves 10 and two exhaust valves 11 are provided for each cylinder.

The exhaust system 30 includes four independent exhaust passages 31 to 34 extending downstream from the respective exhaust ports 9 of the cylinders 2A to 2D (downstream in a flow direction of the exhaust gas passing through the exhaust system 30), a collect section 35 where downstream end portions of the independent exhaust passages 31 to 34 are collected, and a single exhaust pipe 36 extending downstream from the collect section 35. Note that, for example, a catalytic converter and a silencer (both not illustrated) are attached in an intermediate area of the exhaust pipe 36.

The intake system 20 includes four independent intake passages 21 to 24 extending upstream from the respective intake ports 8 of the cylinders 2A to 2D (upstream in the flow direction of air passing through the intake system 20), a surge tank 25 connected with upstream end portion of the independent intake passages 21 to 24 and having a predetermined volume, and a single intake pipe 26 extending upstream from the surge tank 25. Note that, for example, a throttle valve (not illustrated) for adjusting an intake air amount is provided in an intermediate area of the intake pipe 26.

An exhaust gas recirculation device 40 is provided between the intake and exhaust systems 20 and 30, which recirculates, from the exhaust system 30 to the intake system 20, a part of the exhaust gas discharged from each of the cylinders 2A to 2D as EGR gas.

The exhaust gas recirculation device 40 includes a single EGR pipe 41 extending from the exhaust system 30 toward the intake system 20, an EGR manifold 45 provided to branch from a downstream end portion of the EGR pipe 41 (downstream end portion in a flow direction of the EGR gas passing through the exhaust gas recirculation device 40) toward the cylinders 2A to 2D, an openable-and-closeable EGR valve 43 provided at a connection section between the EGR pipe 41 and the EGR manifold 45. An EGR cooler 42 configured with a heat exchanger using, for example, a coolant of the engine is provided in an intermediate area of the EGR pipe 41, and the EGR gas for being recirculated to the cylinders 2A to 2D is cooled by the heat exchanging action of the EGR cooler 42.

The EGR valve 43 is operated to be opened and closed by an actuator (not illustrated), and an amount of EGR gas (EGR amount) to be recirculated to the cylinders 2A to 2D through the EGR pipe 41 and the EGR manifold 45 is adjusted by the opening control of the EGR valve 43 by the actuator. The actuator for the EGR valve 43 has functions to open the EGR valve 43 at least within the first operating range S1 (the performing range of the HCCI combustion) shown in FIG. 2, and control an opening amount of the EGR valve 43 according to the engine load and an engine speed so that an appropriate amount of EGR gas is secured within the first operating range S1.

The EGR manifold 45 has two independent EGR passages 47 and 48 provided for the first and fourth cylinders 2A and 2D, respectively, and a common EGR passage 46 provided commonly for the second and third cylinders 2B and 2C. The common EGR passage 46 and the independent EGR passages 47 and 48 are arranged so that their major portions except for their downstream end portions (connection sections with the independent intake passages 21 to 24) are all positioned in a single plane. Note that, hereinafter, the independent EGR passage 47 for the first cylinder 2A may be referred to as the first independent EGR passage 47, and the independent EGR passage 48 for the fourth cylinder 2D may be referred to as the second independent EGR passage 48.

The common EGR passage 46 is a binary-branched passage branching toward two directions at its midstream. The passage 46 has a single pipe portion 46a extending in one direction from the downstream end portion of the EGR pipe 41 (the install position of the EGR valve 43), and a pair of (left-right symmetrically-shaped) branched pipe portions 46b1 and 46b2 extending toward the second and third cylinders 2B and 2C by branching from a downstream end of the single pipe portion 46a. The branched pipe portions 46b1 and 46b2 are connected at their downstream ends, with downstream end portions of the independent intake passages 22 and 23 (near respective connecting ports to the intake ports 8), and thereby, the common EGR passage 46 is communicated with the intake ports 8 of the second and third cylinders 2B and 2C via the independent intake passages 22 and 23, respectively.

The first independent EGR passage 47 is configured with a single passage extending from the downstream end portion of the EGR pipe 41 toward the first cylinder 2A while curving. A downstream end portion of the first independent EGR passage 47 is connected with the downstream end portion of the independent intake passage 21 for the first cylinder 2A (near the connecting port to the intake port 8), and thereby, the first independent EGR passage 47 is communicated with the intake port 8 of the first cylinder 2A via the independent intake passage 21.

The second independent EGR passage 48 is configured with a single passage extending from the downstream end portion of the EGR pipe 41 toward the fourth cylinder 2D while curving. A downstream end portion of the second independent EGR passage 48 is connected with the downstream end portion of the independent intake passage 24 for the fourth cylinder 2D (near the connecting port to the intake port 8), and thereby, the second independent EGR passage 48 is communicated with the intake port 8 of the fourth cylinder 2D via the independent intake passage 24.

Here, with the engine of this embodiment (the four-cycle four-cylinder engine), as described above, the combustion is performed in the order of the first cylinder 2A, the third cylinder 2C, the fourth cylinder 2D, and then the second cylinder 2B. Thus, the second and third cylinders 2B and 2C sharing the common EGR passage 46 are in a relation where the combustion order is not adjacent therebetween. Therefore, in this embodiment, even in the case where only one common EGR passage 46 is used for both the second and third cylinders 2B and 2C, the EGR gas to be recirculated to the cylinders 2B and 2C do not flow into the common EGR passage 46 simultaneously.

The two (first and second) independent EGR passages 47 and 48 are formed to have the same volume as each other, and the common EGR passage 46 is formed to have the same volume as each of the independent EGR passages 47 and 48. Specifically, in this embodiment, the volumes of the passages 46, 47 and 48 are all set to be the same by setting each passage cross-section area of the common EGR passage 46 and the first and second independent EGR passages 47 and 48 to be the same, and setting the total length of the common EGR passage 46 (i.e., the value obtained by adding the length of the single pipe portion 46a and the length of the branched pipe portions 46b1 and 46b2) to be the same as each length of the first and second independent EGR passages 47 and 48, so that the volumes of the passages 46, 47, and 48 are all set to be the same.

FIGS. 3 to 6 are diagrams showing all the patterns of a communicating path (R1 to R4) inside the EGR manifold 45, which connects between two cylinders where the combustion order is adjacent therebetween. As shown in FIGS. 3 to 6, the communicating path R1 (FIG. 3) is a path which passes the first independent EGR passage 47 and the single pipe portion 46a and branched pipe portion 46b2 of the common EGR passage 46, and connects the first cylinder 2A with the third cylinder 2C where the combustion is performed next to the cylinder 2A. The communicating path R2 (FIG. 4) is a path which passes the branched pipe portion 46b2 and single pipe portion 46a of the common EGR passage 46 and the second independent EGR passage 48, and connects the third cylinder 2C with the fourth cylinder 2D where the combustion is performed next to the cylinder 2C. The communicating path R3 (FIG. 5) is a path which passes the second independent EGR passage 48 and the single pipe portion 46a and branched pipe portion 46b1 of the common EGR passage 46, and connects the fourth cylinder 2D with the second cylinder 2B where the combustion is performed next to the cylinder 2D. The communicating path R4 (FIG. 6) is a path which passes the branched pipe portion 46b1 and single pipe portion 46a of the common EGR passage 46 and the first independent EGR passage 47, and connects the second cylinder 2B with the first cylinder 2A where the combustion is performed next to the cylinder 2B.

According to FIGS. 3 to 6, it can be understood that the volumes of the four communicating paths R1 to R4 are all the same. Thus, all the communicating paths R1 to R4, each of which passes either one of the first and second independent EGR passages 47 and 48 and a part of the common EGR passage 46 (the single pipe portion 46a and either one of the branched pipe portions 46b1 and 46b2), have the same volume because, in this embodiment, as described above, the volumes of the common EGR passage 46, the first independent EGR passage 47, and the second independent EGR passage 48 are the same. For example, when each volume of the common EGR passage 46, the first independent EGR passage 47, and the second independent EGR passage 48 is V in which the volume of the single pipe portion 46a is Va and each volume of the branched pipe portions 46b1 and 46b2 is $\{(V-Va)/2\}$, the volumes of the four communicating paths R1 to R4 all become the same, $\{3\times V/2+Va/2\}$.

As above, in the first embodiment of the invention, the volumes of the communicating paths R1 to R4 in the EGR manifold 45 which connect an arbitrary cylinder with a subsequent cylinder where the combustion is performed next to the arbitrary cylinder in the four-cylinder engine are set to be the same for any combination of cylinders where the combustion order is adjacent therebetween. This leads to homogenizing the intensity of causing intake interference between the cylinders where the combustion order is adjacent, and therefore, such effects are attained that a variation of the EGR gas amount (EGR amount) to be recirculated into the respective cylinders 2A to 2D through the EGR manifold 45 is suppressed, and the combustion performed in the cylinders 2A to 2D is stabilized.

Specifically, when the EGR valve 43 is opened, the intake interference occurs by a wave of pressure change (compressional wave) which is caused in an intake port 8 of one cylinder due to opening or closing the intake valve, propagating through a predetermined communicating path (any one of R1 to R4) in the EGR manifold 45, and reaching the intake port 8 of a subsequent cylinder where the combustion order is next. Here, when the volumes of the communicating paths R1 to R4 are all the same as described above, the intensity of the intake interference occurring between the cylinders where the combustion order is adjacent therebetween can be adjusted to be about the same for any combination of cylinders, and therefore, the amount of EGR gas to be introduced into the cylinders can be prevented from varying greatly.

For example, when the intake interference that acts on a specific cylinder is extremely intense but the intake interference that acts on the other cylinders is weak, it is considered that a situation may occur where the introduction of the EGR gas to the specific cylinder is interrupted relatively greatly, and as a result, the EGR amount for the specific cylinder is extremely reduced compared to the EGR amount for the other cylinders. Regarding this, as this embodiment, when the volumes of the communicating paths R1 to R4 in the EGR manifold 45 are set to be the same so that the intake interference acts on the cylinders at about the same intensity, such a situation as described above is avoided, where the interruption factor of the EGR gas introduction (effect from the intake interference) varies among the cylinders, and about the same EGR amount can be secured for any of the cylinders.

Figure 7:
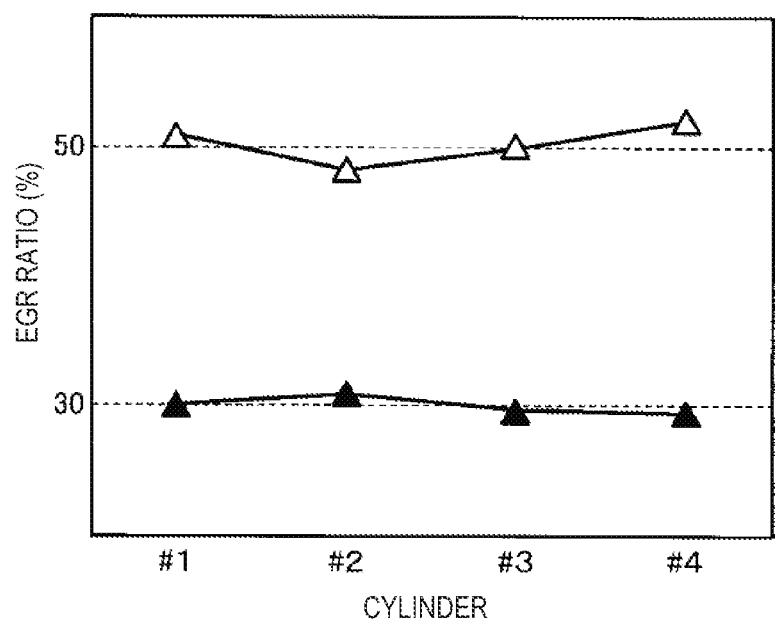
FIG. 7 is a graph of an EGR ratio achieved by an exhaust gas recirculation device of the engine, which is checked for each cylinder.

FIG. 7 is a graph of an actual value of EGR ratio (a mass ratio of the EGR gas contained within the entire gas in the cylinder) of each of the first cylinder 2A (#1), the second cylinder 2B (#2), the third cylinder 2C (#3), and the fourth cylinder 2D (#4), which is acquired when the opening of the EGR valve 43 is controlled to aim for the EGR ratio to become 50% or 30% while using the configuration of the first embodiment. According to the graph in FIG. 7, it can be understood that even though the EGR ratio of each of the cylinders 2A to 2D slightly varies with respect to the line of 50% or 30%, the variation is suppressed comparatively small.

Figure 10:
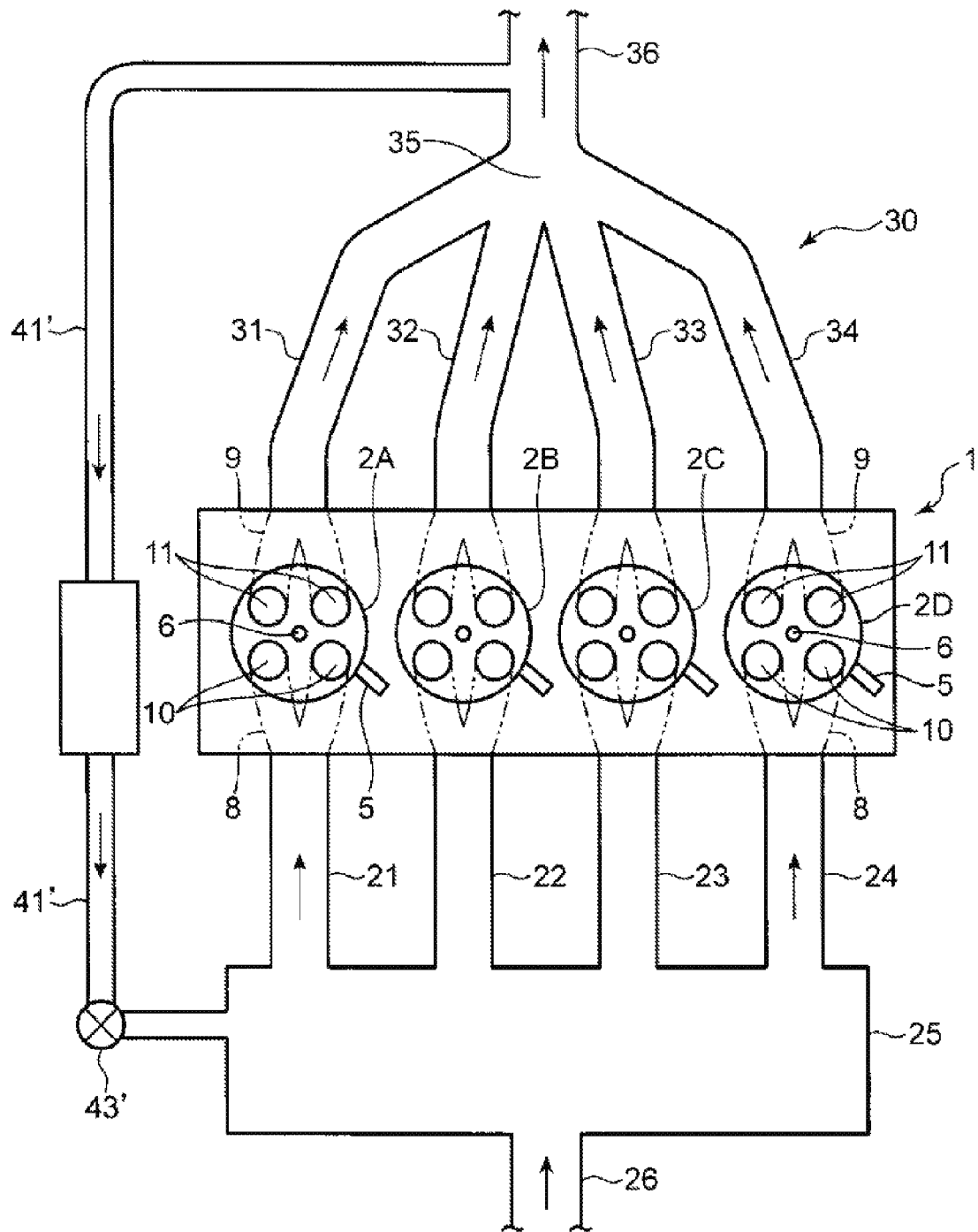
FIG. 10 is a diagram showing a comparative example of the invention.
Figure 11:
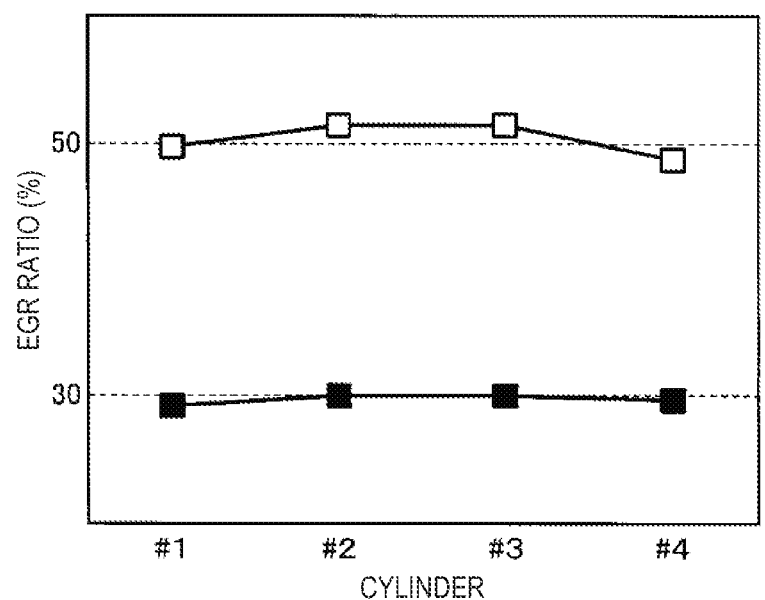
FIG. 11 is a graph of an EGR ratio achieved by an exhaust gas recirculation device in the comparative example, which is checked for each cylinder.

Meanwhile, FIG. 11 is a graph of the EGR ratio of each of the cylinders 2A to 2D in a comparative example in which, unlike to the first embodiment, a downstream end portion of an EGR pipe 41' extending from the exhaust system 30 is connected with the surge tank 25 (the configuration of the comparative example is shown in FIG. 10). According to the graph in FIG. 11, when a target EGR ratio is 50% or 30%, the actual EGR ratio of each of the cylinders 2A to 2D is distributed with a comparatively small variation near 50% or 30%.

In other words, it can be said that even in the first embodiment in which the EGR manifold 45 that can supply the EGR gas separately to each cylinder is used (FIGS. 1 and 7), as described above, by adopting the particular configuration where the volumes of the communicating paths R1 to R4 in the EGR manifold 45 are all set the same, the EGR ratio only varies about the same as the comparative example in which the downstream end portion of the EGR pipe 41' is connected with the common surge tank 25 for all the cylinders (FIGS. 10 and 11). Here, the variation of the EGR ratio is generally known to be smaller when the downstream end portion of the EGR pipe 41' is connected with the surge tank 25 as the comparative example in FIG. 10. In other words, by introducing the EGR gas into the surge tank 25 having a large volume, and then distributing the EGR gas to the cylinders 2A to 2D through the independent intake passages 21 to 24, the intake interference to the cylinders 2A to 2D is uniformly suppressed to be small by the effect of the large-volume surge tank 25, and therefore, the variation of the EGR amount can be suppressed sufficiently small. However in this case, when the EGR amount is to be adjusted by an opening control of an EGR valve 43', the followability of the EGR amount to the opening control of the EGR valve 43' degrades, and a problem arises in the aspect of control responsiveness.

On the other hand, when the EGR manifold 45 that can supply the EGR gas separately to each cylinder is used as described in the first embodiment (FIG. 1), the change of the opening of the EGR valve 43 influences the introduction amount of the EGR gas to the cylinders 2A to 2D more directly, and thus, compared to the comparative example in FIG. 10, the control responsiveness regarding the EGR amount can be improved. Additionally, because the volumes of the communicating paths R1 to R4 in the EGR manifold 45 are all set the same, as shown in FIG. 7, the variation of the EGR amount among the cylinders can be suppressed to the minimum level.

As described above, according to the first embodiment, the variation in the amount of EGR gas to be introduced into the cylinders 2A to 2D can be suppressed effectively while enabling to adjust the EGR amount with excellent responsiveness by the opening control of the EGR valve 43.

Moreover, in the first embodiment, the four-cylinder engine in which the combustion order is set to be the order of the first cylinder 2A, the third cylinder 2C, the fourth cylinder 2D, and then the second cylinder 2B, is provided with the EGR manifold 45 including the single common EGR passage 46 formed to be branched into two passages so as to supply the EGR gas to two cylinders (the second and third cylinders 2B and 2C) which are positioned inwardly in the cylinder aligned direction, and the independent EGR passages 47 and 48 for supplying the EGR gas to the other two cylinders (the first and fourth cylinders 2A and 2D) which are positioned outwardly in the cylinder aligned direction, and the volumes of the common EGR passage 46 and the independent EGR passages 47 and 48 are all set the same. According to such a configuration, both the size reduction of the EGR manifold 45 and the suppression in variation of the EGR amount can be achieved.

For example, another case is also considered, in which, unlike the first embodiment (FIG. 1), each of all the cylinders 2A to 2D of the engine is provided with one independent EGR passage (four passages in total), and all the volumes of the four independent EGR passages are set the same. Also in this case, for any combination of cylinders where the combustion order is adjacent therebetween, the volumes of the communicating paths in the EGR manifold which connect the cylinders can all be the same, and the variation of the EGR amount can be suppressed; however, compared to the configuration in the first embodiment, the volume of the entire EGR manifold increases, causing an increase in material cost and weight. On the other hand, in the first embodiment, the common EGR passage 46 which is binary-branched at its midstream is commonly provided for the second and third cylinders 2B and 2C, and the volume of the common EGR passage 46 is set the same as each volume of the independent EGR passages 47 and 48. Thus, the EGR manifold 45 can be reduced in size as a whole, and thereby, the material cost and the weight can be reduced. Additionally, because the combustion order of the second and third cylinders 2B and 2C is not adjacent to each other, even if the single common EGR passage 46 is provided to the cylinders 2B and 2C, the intake interference does not occur between the cylinders 2B and 2C through the common EGR passage 46. Therefore, according to the first embodiment, the variation in the amount of EGR gas to be introduced into the cylinders 2A to 2D can be suppressed while effectively reducing the size of the EGR manifold 45.

Additionally, in the first embodiment, the common EGR passage 46 and the independent EGR passages 47 and 48 of the EGR manifold 45 are arranged in a single plane. Thus, there is an advantage that the manufacture and attaching of the EGR manifold 45 becomes easy.

Moreover, in the first embodiment, within the first operating range S1 which is set to be a part of the engine load range (FIG. 2), the combustion is performed in which the mixture gas of the fuel containing gasoline and air self-ignites (HCCI combustion), as well as the EGR valve 43 is opened within the performing range of the HCCI combustion and a desired amount of EGR gas is introduced into the cylinders 2A to 2D. According to such a configuration, within the performing range of the HCCI combustion, in which the timing and success of the self-ignition are easily influenced by the amount of EGR gas to be introduced into the cylinders (first operating range S1), the variation in the amount of EGR gas to the cylinders 2A to 2D is suppressed, and about the same amount of EGR gas is secured for all the cylinders. In this manner, a large variation in start timing of the HCCI combustion among the cylinders and misfire can be prevented effectively, and thus, the HCCI combustions in all the cylinders 2A to 2D can be stabilized effectively.

Note that, in the first embodiment, since the volumes of the common EGR passage 46 and the independent EGR passages 47 and 48 of the EGR manifold 45 are all the same, as a result, the volumes of the communicating paths R1 to R4 in the EGR manifold 45 which connect the cylinders where the combustion order is adjacent therebetween become all the same; however, the phrase "the same" used here regarding the volume does not necessarily mean exactly the same, but the difference in volume is required to be small enough so that the variation in the amount of EGR gas to the cylinders 2A to 2D settles below a predetermined allowable value. Here, the allowable value of the variation in the amount of EGR gas can be determined to be a value which does not cause a large difference in the mode (the combustion start timing and the combustion period) of the HCCI combustion performed in the cylinders 2A to 2D, in other words, a value with which the torque generated by the HCCI combustion in each cylinder is homogenized and the engine speed is stabilized. Obviously, in the case of SI combustion, because the combustion start timing can be uniformed by the spark-ignition, some extent of variation in the EGR amount will not be a problem; however, in the case of the HCCI combustion, the variation in the EGR amount is required to be suppressed sufficiently small so as to make the combustion start timing uniform. Therefore, here, when the difference in volume among the communicating paths R1 to R4 is sufficiently small and the variation in the amount of EGR gas to the cylinders caused by the difference becomes sufficiently small that the start timing of the HCCI combustion becomes uniform, the volumes of the communicating paths R1 to R4 are considered to be substantially the same, and such a case is also treated that the volume is "the same."

Moreover, in the first embodiment, the downstream end portions of the common EGR passage 46 and the independent EGR passages 47 and 48 of the EGR manifold 45 are connected with the respective downstream end portions (near the respective connecting ports of the intake ports 8) of the independent intake passages 21 to 24 of the cylinders 2A to 2D; however, additional ports may be provided of which one end is open to the intake ports 8 of the cylinders 2A to 2D and the other end is open to the intake side wall surface of the engine body 1, and the downstream end portions of the common EGR passage 46 and the independent EGR passages 47 and 48 may be connected with the respective openings of the additional ports to the intake side wall surface.

Furthermore, in the first embodiment, the volumes of the common EGR passage 46 and the first and second EGR passages 47 and 48 are all the same; however, the volume of the common EGR passage 46 (the total volume of the single pipe portion 46*a* and the pair branched pipe portions 46*b*1 and 46*b*2) is not necessarily the same as the volumes of the first and second independent EGR passages 47 and 48, and may be different. However, to equalize the volumes of all the four communicating paths R1 to R4 as described above, the pair of branched pipe portions 46*b*1 and 46*b*2 within the common EGR passage 46 are required to have the same volume therebetween.

Second Embodiment

Figure 8:
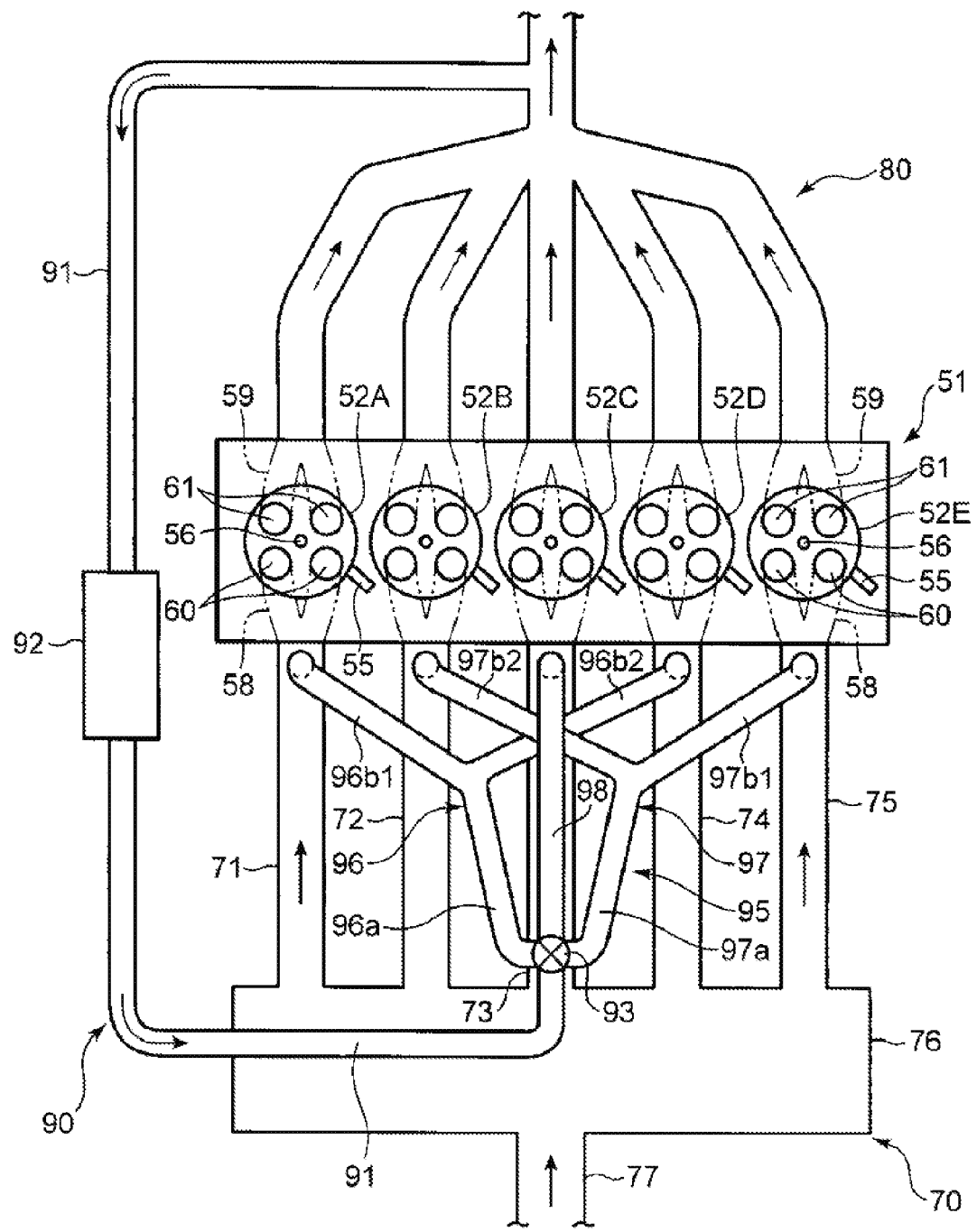
FIG. 8 is a diagram showing an overall configuration of an engine applied with an exhaust gas recirculation device according to a second embodiment of the invention.
Figure 9A:
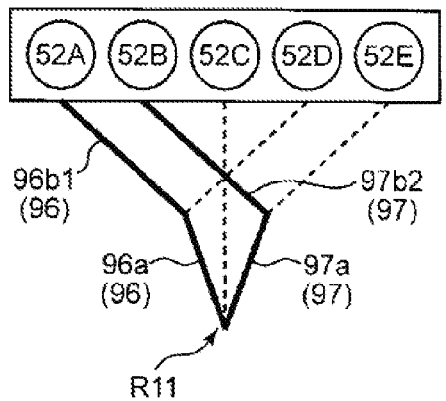
FIGS. 9A to 9E are diagrams showing all the patterns of communicating paths inside the EGR manifold, each path connecting between two cylinders where the combustion order is continuous therebetween in the engine.
Figure 9B:
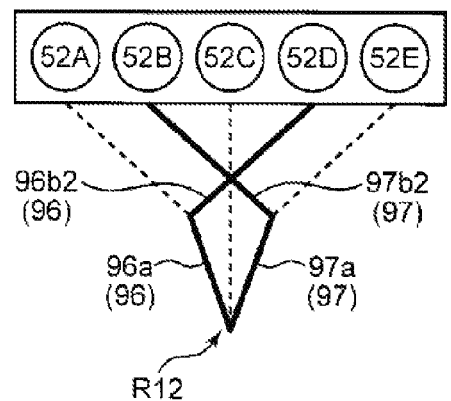
Figure 9C:
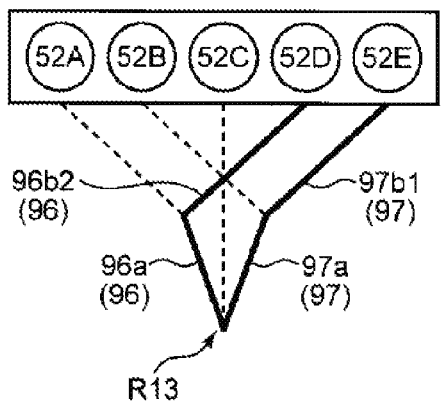
Figure 9D:
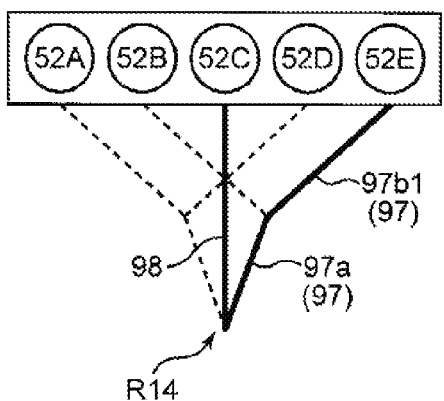
Figure 9E:
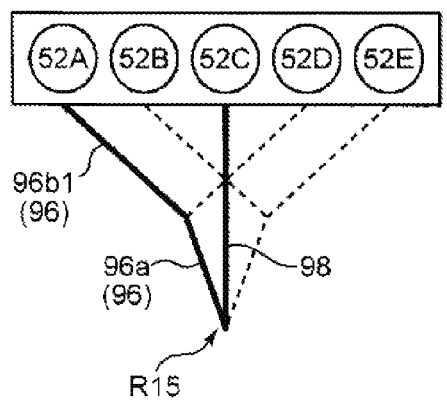

FIG. 8 is a diagram illustrating a second embodiment of the invention. The engine of this embodiment includes an engine body 51 of an in-line five-cylinder and four-cycle type having five cylinders 52A to 52E aligned in a specific direction, an intake system 70, and an exhaust system 80. Note that, similar to the first embodiment, an injector 55, an ignition plug 56, intake ports 58, exhaust ports 59, intake valves 60, and exhaust valves 61 are provided to each of the cylinders 52A to 52E.

In the four-cycle five-cylinder engine as described above, pistons provided to the respective cylinders 52A to 52E move in the up-and-down directions with their phases different from each other by 144° in crank angle (144° CA). Therefore, combustion timings in the cylinders 52A to 52E are set to vary in phase from each other by 144° CA. Specifically, although various patterns can be considered for the combustion order among the cylinders 52A to 52E, in this embodiment, the combustion is performed in the order of the first cylinder 52A, the second cylinder 52B, the fourth cylinder 52D, the fifth cylinder 52E, and then the third cylinder 52C.

The intake system 70 includes five independent intake passages 71 to 75 extending upstream from the intake ports 58 of the cylinders 52A to 52E (upstream in the flow direction of air passing through the intake system 70), a surge tank 76 connected with upstream end portions of the independent intake passages 71 to 75 and having a predetermined volume, and a single intake pipe 77 extending upstream from the surge tank 76.

An exhaust gas recirculation device 90 is provided between the intake and exhaust systems 70 and 80, which recirculates, from the exhaust system 80 to the intake system 70, a part of the exhaust gas discharged from each of the cylinders 52A to 52E as EGR gas.

The exhaust gas recirculation device 90 includes a single EGR pipe 91 extending from the exhaust system 80 toward the intake system 70, an EGR manifold 95 provided to branch from a downstream end portion of the EGR pipe 91 toward the cylinders 52A to 52E, an openable-and-closeable EGR valve 93 provided at a connection section between the EGR pipe 91 and the EGR manifold 95, and an EGR cooler 92 provided in an intermediate area of the EGR pipe 91.

The EGR manifold 95 has a first common EGR passage 96 provided commonly for the first and fourth cylinders 52A and 52D, a second common EGR passage 97 provided commonly for the second and fifth cylinders 52B and 52E, and a single independent EGR passage 98 provided exclusively for the third cylinder 52C.

The first common EGR passage 96 is a binary-branched passage branching toward two directions in its midstream. The passage 96 has a single pipe portion 96a extending from the downstream end portion of the EGR pipe 91 (the install position of the EGR valve 93), and a pair of branched pipe portions 96b1 and 96b2 connected with the downstream end portions (near respective connecting ports to the intake ports 58) of the independent intake passages 71 and 74 for the first and fourth cylinders 52A and 52D while extending by branching from a downstream end of the single pipe portion 96a.

The second common EGR passage 97 is a binary-branched passage branching toward two directions in its midstream. The passage 97 has a single pipe portion 97a extending from the downstream end portion of the EGR pipe 91, and a pair of branched pipe portions 97b1 and 97b2 connected with the downstream end portions of the independent intake passages 75 and 72 for the fifth and second cylinders 52E and 52B while extending by branching from a downstream end of the single pipe portion 97a.

The independent EGR passage 98 is configured with a single passage extending in a predetermined direction, and is provided to couple between a downstream end portion of the EGR pipe 41 and a downstream end portion of the independent intake passage 73 for the third cylinder 2C.

Here, with the engine of this embodiment (the four-cycle five-cylinder engine), as described above, the combustion is performed in the order of the first cylinder 52A, the second cylinder 52B, the fourth cylinder 52D, the fifth cylinder 52E, and then the third cylinder 52C. Thus, the first and fourth cylinders 52A and 52D sharing the common EGR passage 96 are in a relation where the combustion order is not adjacent therebetween. Similarly, the second and fifth cylinders 52B and 52E sharing the second common EGR passage 97 are also in a relation where the combustion order is not adjacent therebetween.

FIGS. 9A to 9E are diagrams showing all the patterns of a communicating path (R11 to R15) inside the EGR manifold 95, which connects between two cylinders where the combustion order is adjacent therebetween. As shown in FIGS. 9A to 9E, the communicating path R11 (FIG. 9A) is a path which passes the branched pipe portion 96b1 and single pipe portion 96a of the first common EGR passage 96 and the single pipe portion 97a and branched pipe portion 97b2 of the second common EGR passage 97, and it connects the first cylinder 52A with the second cylinder 52B where the combustion is performed next to the cylinder 52A. The communicating path R12 (FIG. 9B) is a path which passes the branched pipe portion 97b2 and single pipe portion 97a of the second common EGR passage 97 and the single pipe portion 96a and branched pipe portion 96b2 of the first common EGR passage 96, and it connects the second cylinder 52B with the fourth cylinder 52D where the combustion is performed next to the cylinder 52B. The communicating path R13 (FIG. 9C) is a path which passes the branched pipe portion 96b2 and single pipe portion 96a of the first common EGR passage 96 and the single pipe portion 97a and branched pipe portion 97b1 of the second common EGR passage 97, and it connects the fourth cylinder 52D with the fifth cylinder 52E where the combustion is performed next to the cylinder 52D. The communicating path R14 (FIG. 9D) is a path which passes the branched pipe portion 97b and single pipe portion 97a of the second common EGR passage 97 and the independent EGR passage 98, and it connects the fifth cylinder 52E with the third cylinder 52C where the combustion is performed next to the cylinder 52E. The communicating path R15 (FIG. 9E) is a path which passes the independent EGR passage 98 and the single pipe portion 96a and branched pipe portion 96b1 of the first common EGR passage 96, and it connects the third cylinder 52C and the first cylinder 52A where the combustion is performed next to the cylinder 52C.

In this embodiment, the volumes of the five communicating paths R11 to R15 are all set the same. Although various kinds of methods can be considered for this setting, in this embodiment, the single pipe portion 96a of the first common EGR passage 96 and the single pipe portion 97a of the second common EGR passage 97 are set to have the same volume Vx, the pair of branched pipe portions 96b1 and 96b2 of the first common EGR passage 96 are set to have the same volume Vy, the pair of branched pipe portions 97b1 and 97b2 of the second common EGR passage 97 are set to have the same volume Vy (i.e., same as the branched pipe portions 96b1 and 96b2 of the first common EGR passage 96), and the independent EGR passage 98 is set to have a volume Vx+Vy. Thus, the volumes of the five communicating paths R11 to R15 are all set to be the same value, $\{2 \times Vx + 2 \times Vy\}$. Note that, although in FIGS. 9A to 9E, the independent EGR passage 98 seems to have smaller volume than Vx+Vy, the volume of the independent EGR passage 98 can be Vx+Vy by forming the independent EGR passage 98 to have an arched curve shape or having a larger cross-sectional area than that of the common EGR passages 96 and 97.

As above, in the second embodiment of the invention, the volumes of the communicating paths R11 to R15 in the EGR manifold 95, each connecting an arbitrary cylinder with a subsequent cylinder where the combustion is performed next to the arbitrary cylinder in the five-cylinder engine are set to the same for any combination of cylinders where the combustion order is adjacent therebetween. In this manner, similar to the first embodiment, the intensity of intake interference occurring between the cylinders where the combustion order is adjacent is homogenized, and therefore, a variation of the EGR gas amount (EGR amount) to be recirculated into the cylinders 52A to 52E through the EGR manifold 95 can be suppressed effectively.

Note that, also in the second embodiment, the aspect that the phrase "the same" used here regarding the volume means not necessarily exactly the same, but also means substantially the same (the difference is small enough such that the variation in the EGR amount among the cylinders settles below an allowable value) is similar to the first embodiment.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE NUMERALS

1 Engine Body
2A to 2D Cylinder
20 Intake System
30 Exhaust System
40 Exhaust Recirculation Device
41 EGR Pipe
43 EGR Valve
45 EGR Manifold
46 Common EGR Passage
46a Single Pipe Portion
46b1, 46b2 Branched Pipe Portion
47 (First) Independent EGR Passage
48 (Second) Independent EGR Passage
R1 to R4 Communicating Path
51 Engine Body
52A to 52E Cylinder
70 Intake System
80 Exhaust System
90 Exhaust Recirculation Device
91 EGR Pipe
93 EGR Valve
95 EGR Manifold
96 (First) Common EGR Passage
96a Single Pipe Portion
96b1, 96b2 Branched Pipe Portion
97 (Second) Common EGR Passage
97a Single Pipe Portion
97b1, 97b2 Branched Pipe Portion
98 Independent EGR Passage
R11 to R15 Communicating Path

The invention claimed is:

1. An exhaust gas recirculation device for recirculating, from an exhaust system to an intake system, a part of exhaust gas discharged from each of a plurality of cylinders that are provided to a multi-cylinder engine as EGR gas, the device comprising:

a single EGR pipe extending from the exhaust system toward the intake system of the engine;

an EGR manifold provided to branch from a downstream end portion of the EGR pipe toward each of the plurality of cylinders; and an EGR valve for adjusting an amount of EGR gas to be recirculated to each cylinder through the EGR pipe and the EGR manifold, wherein the EGR manifold includes:

one or more common EGR passages having a single pipe portion extending from the downstream end portion of the EGR pipe, and branched pipe portions extending while branching from the single pipe portion and provided to communicate with intake ports of two or more of the plurality of cylinders of which the combustion order is not adjacent therebetween; and one or more independent EGR passages extending from the downstream end portion of the EGR pipe and provided to communicate with an intake port of a specific cylinder, and wherein shapes of the one or more common EGR passages and the one or more independent EGR passages are respectively set so that a communicating path in the EGR manifold which communicates an arbitrary cylinder with a subsequent cylinder where a combustion is performed next to the arbitrary cylinder has the same volume for any combination of the cylinders of which the combustion order is adjacent therebetween.

2. The device of claim 1, wherein the engine is a four-cylinder engine having a total of four cylinders aligned in a specific direction and of which the combustion order is set to the order of the first cylinder, the third cylinder, the fourth cylinder, and then the second cylinder starting from the cylinder at one end in the cylinder aligned direction, wherein the EGR manifold includes one common EGR passage for supplying the EGR gas to two of the cylinders positioned inward in the cylinder aligned direction, and two independent EGR passages for supplying the EGR gas to the other two cylinders positioned outward in the cylinder aligned direction, and wherein shapes of the common EGR passage and the independent EGR passages are respectively set so that all the common and independent EGR passages have the same volume.

3. The device of claim 2, wherein the common EGR passage and the independent EGR passages are arranged in the same plane.

4. The device of claim 1, wherein an HCCI combustion that is caused by a self-ignition of fuel containing gasoline is able to be performed in the engine at least within a part of an engine operating range, and wherein the EGR valve is opened at least within an operating range where the HCCI combustion is performed.

5. The device of claim 2, wherein an HCCI combustion that is caused by a self-ignition of fuel containing gasoline is able to be performed in the engine at least within a part of an engine operating range, and wherein the EGR valve is opened at least within an operating range where the HCCI combustion is performed.

6. The device of claim 3, wherein an HCCI combustion that is caused by a self-ignition of fuel containing gasoline is able to be performed in the engine at least within a part of an engine operating range, and wherein the EGR valve is opened at least within an operating range where the HCCI combustion is performed.

* * * * *